(12) United States Patent
Yoneyama et al.

(10) Patent No.: US 8,174,570 B2
(45) Date of Patent: May 8, 2012

(54) SIGN RECOGNITION DEVICE

(75) Inventors: Shogo Yoneyama, Tokyo (JP); Takashi Hirano, Tokyo (JP); Wataru Yamazaki, Tokyo (JP); Atsushi Matsumoto, Tokyo (JP); Takenori Kawamata, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 389 days.

(21) Appl. No.: 12/627,468

(22) Filed: Nov. 30, 2009

(65) Prior Publication Data

US 2010/0302361 A1 Dec. 2, 2010

(30) Foreign Application Priority Data

Jun. 2, 2009 (JP) ................................ 2009-133115

(51) Int. Cl.
*H04N 7/18* (2006.01)

(52) U.S. Cl. ........................................ 348/135; 348/142

(58) Field of Classification Search .................... None
See application file for complete search history.

(56) References Cited

U.S. PATENT DOCUMENTS

2008/0002891 A1* 1/2008 Shibata .......................... 382/209
2009/0074241 A1* 3/2009 Miller et al. .................. 382/100
2009/0169055 A1* 7/2009 Ishikawa ....................... 382/104
2010/0074469 A1* 3/2010 Nakamori et al. ............ 382/103

FOREIGN PATENT DOCUMENTS

| JP | 2005-4410 A | 1/2005 |
| JP | 4051990 B2 | 12/2007 |

* cited by examiner

*Primary Examiner* — John B. Walsh

(74) *Attorney, Agent, or Firm* — Birch, Stewart, Kolasch & Birch, LLP

(57) ABSTRACT

A sign recognition device includes a sign effective range data recording unit for prestoring effective range conditions shown by a sign and an auxiliary sign, a sign recognition unit for recognizing a sign and an auxiliary sign by using a captured image of a roadway in front of a vehicle, a vehicle information acquiring unit for acquiring vehicle information, a map information acquiring unit for acquiring map information about a map of an area surrounding the vehicle, and a sign effective range determining unit for determining whether or not the vehicle is staying in the effective range specified with the sign and the auxiliary sign which have been recognized by the sign recognition unit by using the effective range conditions stored in the sign effective range data recording unit, the vehicle information, and the map information.

14 Claims, 12 Drawing Sheets

<Sign>

| Sign ID | Sign Category | Attribute Value | Number of Effective Road Sections | Prescribed Size | Image Pattern | ... |
|---|---|---|---|---|---|---|
| 1 | Regulatory Sign | Maximum Speed Limit | 1 | 80×80 |  | |
| 2 | Regulatory Sign | Traveling Direction Designation | 1 | 80×80 |  | |
| ... | | | | | | |
| N | | | | | | |

(b)

<Auxiliary Sign>

| Auxiliary Sign ID | Type | Attribute Value | Image Pattern | ... |
|---|---|---|---|---|
| 1 | Distance and Section | Start |  | |
| 2 | Distance and Section | End |  | |
| 3 | Distance and Section | 100 | For Next 100 Meters | |
| 4 | Time | 8—20 | 8 - 20 | |
| 5 | Time | Except for Sun and Holidays | Except for Sun and Holidays | |
| 6 | Vehicle Type | Truck |  | |
| .. | | | | |
| M | | | | |

FIG. 8

| Type | Vehicle Information Acquired Value |
|---|---|
| Vehicle Type | Truck |
| Current Date | 2009/3/13 (Fri.) 10:31 |
| Current Position (Latitude, Longitude, Altitude) | (84, 134, 20) |
| Vehicle Direction | North |
| Horn | OFF |
| Brake | OFF |
| ... | ... |

FIG. 9

| Effective Sign ID | Sign | Sign and Auxiliary Sign IDs | Registered Position | Number of Traveled Road Sections |
|---|---|---|---|---|
| 1 | Road Sign | 2 | (84, 134, 20) | 0 |
| | Auxiliary Sign | 6 | | |
| 2 | Road Sign | — | — | — |
| | Auxiliary Sign | — | | |
| 3 | Road Sign | — | — | — |
| | Auxiliary Sign | — | | |
| ... | | | | |
| P | | | | |

FIG. 11

| Effective Sign ID | Road Sign | Sign and Auxiliary Sign IDs | Registered Position | Number of Traveled Road Sections |
|---|---|---|---|---|
| 1 | Sign | 2 | (84, 134, 20) | 2 |
|  | Auxiliary Sign | 6 |  |  |
| 2 | Sign | — | — | — |
|  | Auxiliary Sign | — |  |  |
| 3 | Sign | — | — | — |
|  | Auxiliary Sign | — |  |  |
| ... |  |  |  |  |
| P |  |  |  |  |

FIG. 12

(a)
<Sign>

| Sign ID | Sign Category | Attribute Value | Number of Effective Road Sections | Preceding Distance | Prescribed Size | Image Pattern |
|---|---|---|---|---|---|---|
| 1 | Warning Sign | School or Kindergarten | 1 | 50~200m | 80×80 |  |
| 2 | Warning Sign | Railroad Crossing | 1 | 50~120m | 80×80 |  |
| ... | | | | | | |
| N | | | | | | |

(b)
<Auxiliary Sign>

| Auxiliary Sign ID | Type | Attribute Value | Image Pattern | ... |
|---|---|---|---|---|
| 1 | Distance and Section | Section |  | |
| 2 | Distance and Section | Section |  | |
| 3 | Distance and Section | 100 | For Next 100 Meters | |
| 4 | Time | 8−20 | 8 - 20 | |
| 5 | Time | Except for Sun and Holidays | Except for Sun and Holidays | |
| 6 | Vehicle Type | Truck |  | |
| .. | | | | |
| M | | | | |

<Sign>

| Sign ID | Sign Category | Attribute Value | Number of Effective Road Sections | Prescribed Size | Vehicle Sensor Termination Condition | Image Pattern |
|---|---|---|---|---|---|---|
| 1 | Regulatory Sign | Maximum Speed Limit | 1 | 80×80 | Horn=ON |  |
| 2 | Regulatory Sign | Traveling Direction Designation | 1 | 80×80 | Brake=ON |  |
| ... | | | | | | |
| N | | | | | | |

(b)

<Auxiliary Sign>

| Auxiliary Sign ID | Type | Attribute Value | Image Pattern | ... |
|---|---|---|---|---|
| 1 | Distance and Section | Start |  | |
| 2 | Distance and Section | End |  | |
| 3 | Distance and Section | 100 | 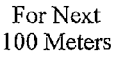 | |
| 4 | Time | 8−20 | 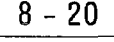 | |
| 5 | Time | Except for Sun and Holidays | 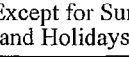 | |
| 6 | Vehicle Type | Truck |  | |
| .. | | | | |
| M | | | | |

SIGN RECOGNITION DEVICE

BACKGROUND OF THE INVENTION

1. Field of the Invention

The present invention relates to a sign recognition device for recognizing road signs during travel of a vehicle and presenting them to the driver of the vehicle.

2. Description of Related Art

A conventional sign recognition device recognizes road signs from an image captured with a vehicle-mounted camera during travel of a vehicle and produces a screen display of the recognized road signs on a car navigation apparatus to notify them to the driver of the vehicle. For example, according to "Display device for displaying road signs and so on, and method of displaying an image, such as road signs" disclosed by a Japanese patent application (JP, 2005-4410,A), road signs are recognized from an image captured with a vehicle-mounted camera and a screen display of the road signs is produced on a car navigation apparatus, and, when the traveled distance from the recognized position of a recognized road sign exceeds a designated value, when the time which has elapsed since the time at which the road sign was recognized exceeds a designated value, or when receiving an instruction from the driver, the screen display is ended.

Conventional sign recognition devices are constructed as mentioned above, and determine the effective range of each road sign which they have recognized from the traveled distance or elapsed time and switches between display and non-display of each road sign on a car navigation apparatus according to a result of the determination. Therefore, in a case in which either an effective time period or vehicle type is specified with an auxiliary sign, in a case in which there is an advance warning sign showing a specified point existing forwardly, such as a sharp bend or lane warning sign, or the like, these signs are not taken into consideration. A problem is therefore that the effective range of a road sign cannot be determined correctly. Furthermore, because the effective range of a road sign is defined by the number of road sections, instead of the distance from the position of the road sign, the effective range of a road sign cannot be correctly determined by using a conventional method. A further problem is that when the vehicle makes a right or left turn and then deviates from a continuous road section, the effective range of the recognized road sign cannot be correctly determined because the vehicle also deviates from the effective range of the recognized road sign.

SUMMARY OF THE INVENTION

The present invention is made in order to solve the above-mentioned problems, and it is therefore an object of the present invention to provide a sign recognition device that correctly determines the effective range of a road sign which it has recognized to enable correct presentation of the road sign to the driver.

In accordance with the present invention, there is provided a sign recognition device including: a sign effective range data recording unit for storing conditions for an effective range shown by a sign and an auxiliary sign; a sign recognition unit for recognizing a sign and an auxiliary sign by using a captured image of a roadway in front of a vehicle; and a sign effective range determining unit for determining whether or not the vehicle is staying in an effective range specified by the sign and the auxiliary sign which have been recognized by the sign recognition unit by using information about the vehicle, map information, and conditions for the effective range which are stored in the sign effective range data recording unit, in which the sign effective range determining unit includes a start point position determining unit for determining a position of a start point of the effective range specified by the sign and the auxiliary sign which have been recognized by the sign recognition unit, and for, when the vehicle has entered the effective range specified by the sign and the auxiliary sign, storing a result of the recognition of the sign and the auxiliary sign in an effective sign storage buffer, and an end point position determining unit for determining a position of an end point of the effective range specified by the sign and the auxiliary sign whose recognition result is stored in the effective sign storage buffer, and for, when the vehicle has deviated from the effective range specified by the sign and the auxiliary sign, deleting the result of the recognition of the sign and the auxiliary sign from the effective sign storage buffer.

Because the sign recognition device in accordance with the present invention determines whether or not the vehicle is staying in the effective range specified by a sign and an auxiliary sign which have been recognized by the sign recognition unit by using the conditions for the effective range which are shown by the sign and the auxiliary sign, the sign recognition device can correctly determine the effective range of the road sign which the sign recognition device has recognized, and can provide correct presentation of the road sign to the driver.

Further objects and advantages of the present invention will be apparent from the following description of the preferred embodiments of the invention as illustrated in the accompanying drawings.

BRIEF DESCRIPTION OF THE DRAWINGS

FIG. 5 is an explanatory drawing showing effective range data stored in a sign effective range data recording unit shown in FIG. 1, and FIG. 5(*a*) shows effective range data about signs and FIG. 5(*b*) shows effective range data about auxiliary signs;

FIG. 8 is an explanatory drawing showing an example of vehicle information which is acquired by a vehicle information acquiring unit shown in FIG. 1;

FIG. 9 is an explanatory drawing showing information about currently-effective road signs which is held by an effective sign storage buffer shown in FIG. 1;

FIG. 11 is an explanatory drawing showing a state of the effective sign storage buffer after the "number of traveled road sections" shown in FIG. 9 is updated;

FIG. 12 is an explanatory drawing showing effective range data stored in a sign effective range data recording unit in accordance with Embodiment 2, and FIG. 12(a) shows effective range data about signs and FIG. 12(b) shows effective range data about auxiliary signs;

FIG. 17 is an explanatory drawing showing effective range data stored in a sign effective range data recording unit in accordance with Embodiment 4, and FIG. 17(a) shows effective range data about signs and FIG. 17(b) shows effective range data about auxiliary signs.

DETAILED DESCRIPTION OF THE PREFERRED EMBODIMENTS

Figure 1:
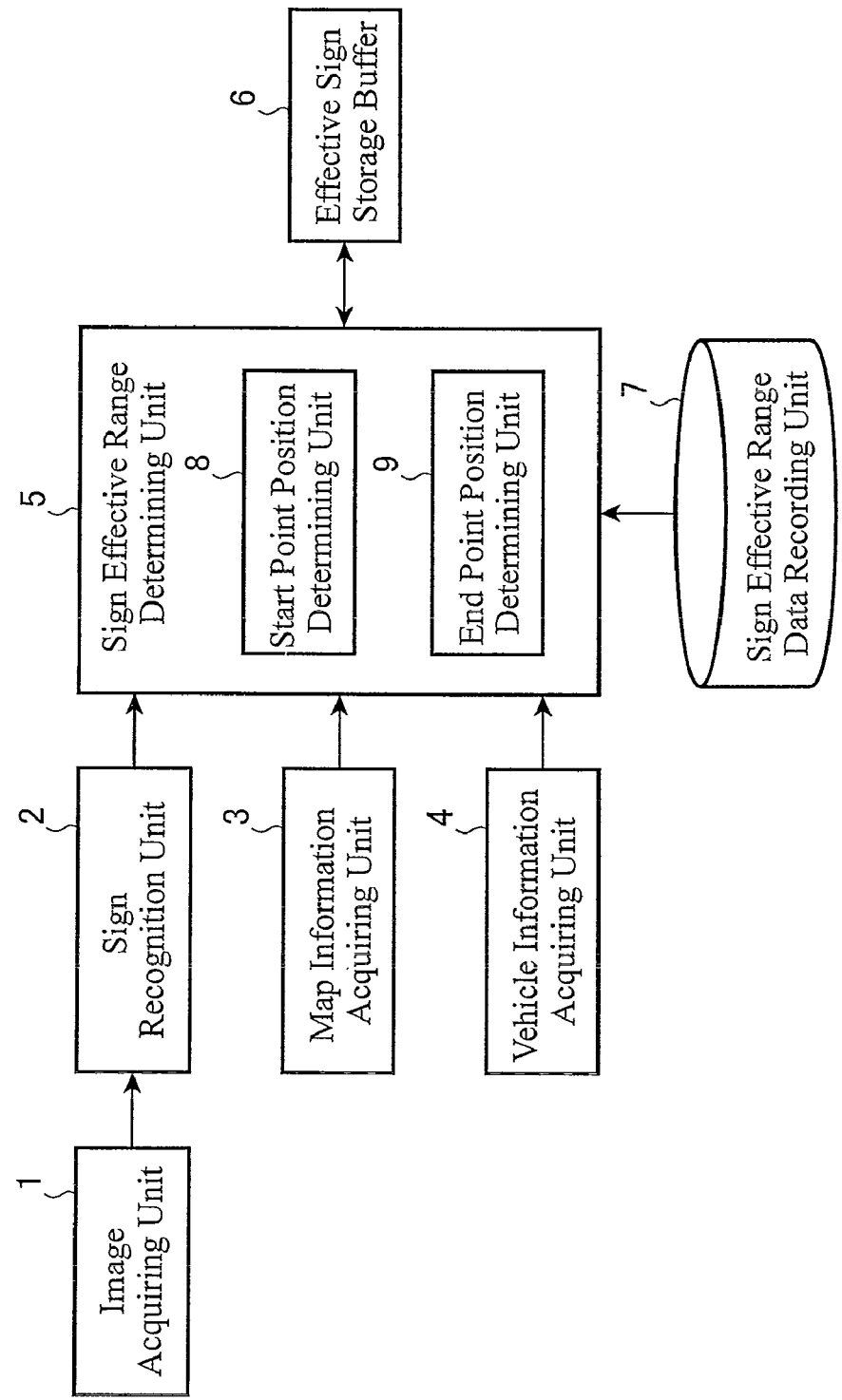
FIG. 1 is a block diagram showing the structure of a sign recognition device in accordance with Embodiment 1 of the present invention.

The preferred embodiments of the present invention will be now described with reference to the accompanying drawings. In the following description of the preferred embodiments, like reference numerals refer to like elements in the various views.

Embodiment 1.

FIG. 1 is a block diagram showing the structure of a sign recognition device in accordance with Embodiment 1 of the present invention. The sign recognition device is mounted in a vehicle, and the output of this sign recognition device is used in order to produce a screen display (or an audio output) on a display of a car navigation apparatus.

In the sign recognition device shown in FIG. 1, an image acquiring unit 1 captures an image which is obtained by shooting a roadway in front of the vehicle by using a vehicle-mounted camera. The sign recognition unit 2 recognizes a road sign (a sign and an auxiliary sign) from image information which the image acquiring unit 1 has acquired. A map information acquiring unit 3 acquires map information, such as road information about roads existing in an area surrounding the vehicle and information about structures existing in the area surrounding the vehicle, on the basis of the position of the vehicle which is based on data received from GPS (Global Positioning System) satellites and so on, and map data. A vehicle information acquiring unit 4 acquires the position of the vehicle which is based on the data received from the GPS satellites, and vehicle information, such as information about the state of the vehicle including information about the brake state, which is based on the outputs of various sensors installed in the vehicle, and the vehicle type.

Effective range data showing effective range conditions are stored for every sign type and for every auxiliary sign type in a sign effective range data recording unit 7. A sign effective range determining unit 5 determines whether or not the vehicle is staying in the effective range of a road sign which the sign recognition unit 2 has recognized by using the map information acquired by the map information acquiring unit 3, the vehicle information acquired by the vehicle information acquiring unit 4, and the information stored in the sign effective range data recording unit 7, and stores information about the road sign which the sign effective range determining unit has determined to be effective (i.e., the sign effective range determining unit has determined the vehicle is staying in the effective range of the road sign) in an effective sign storage buffer 6. The effective sign storing buffer 6 stores the information about the road sign which the sign effective range determining unit 5 has determined to be effective as needed.

The sign effective range determining unit 5 is provided with a start point position determining unit 8 and an end point position determining unit 9. The start point position determining unit 8 determines whether the vehicle has exceeded the start point of the effective range of a road sign which the sign recognition unit 2 has recognized by using the vehicle information acquired by the vehicle information acquiring unit 4 and the information stored in the sign effective range data recording unit 7. The end point position determining unit 9 determines whether the vehicle has exceeded the end point of the effective range of a road sign which the sign recognition unit 2 has recognized by using the map information acquired by the map information acquiring unit 3, the vehicle information acquired by the vehicle information acquiring unit 4, and the information stored in the sign effective range data recording unit 7.

Figure 2:
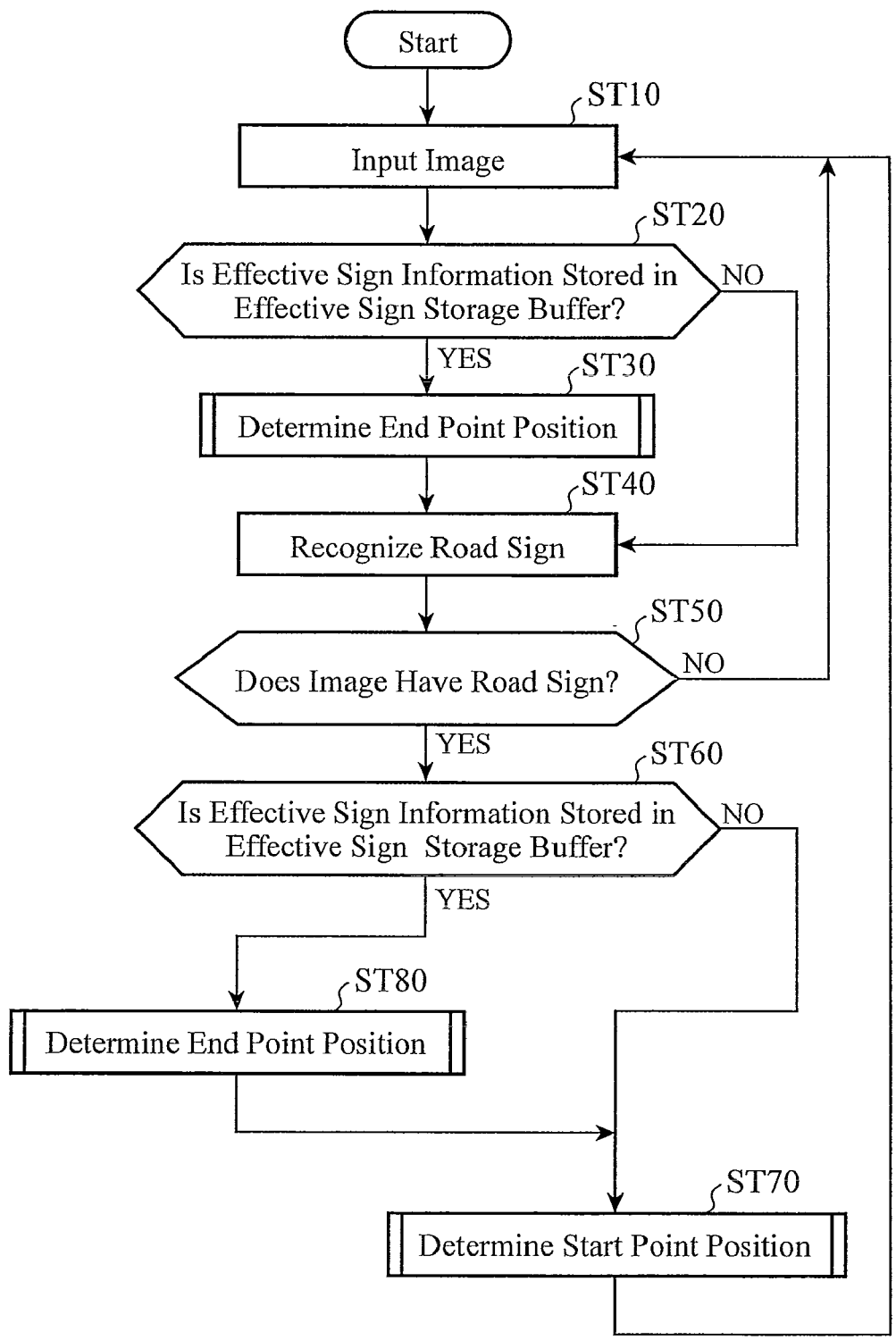
FIG. 2 is a flow chart showing the operation of the sign recognition device shown in FIG. 1.
Figure 3:
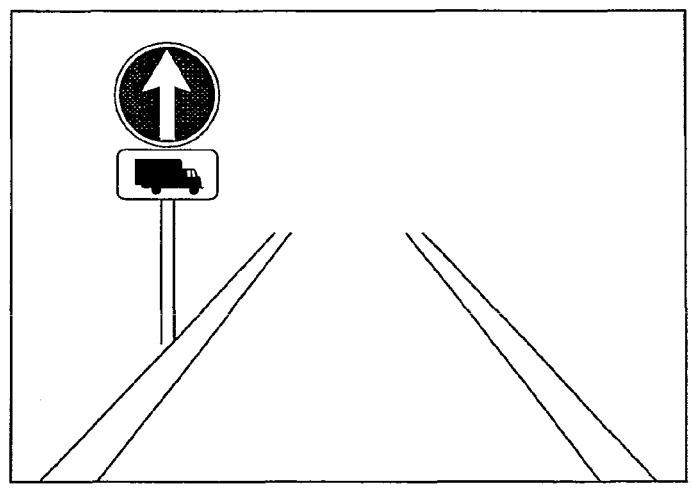
FIG. 3 is a diagram showing an example of a road image acquired by an image acquiring unit shown in FIG. 1.

Next, the operation of the sign recognition device will be explained. FIG. 2 is a flow chart showing the operation of the sign recognition device shown in FIG. 1. In step ST10, the image acquiring unit 1 reads the image of a roadway in front of the vehicle which is captured by the vehicle-mounted camera. FIG. 3 is a diagram showing an example of the roadway image which the image acquiring unit 1 has acquired. Hereafter, an explanation will be made by using the roadway image shown in FIG. 3.

The sign effective range determining unit 5, in step ST20, makes a search so as to determine whether information about a currently-effective sign and a currently-effective auxiliary sign is stored in the effective sign storage buffer 6. When information about an effective sign and an effective auxiliary sign is stored (if "Yes" in step ST20), the end point position determining unit 9, in next step ST30, determines whether or not the vehicle has exceeded the end point position of the sign. In contrast, unless information about an effective sign and an effective auxiliary sign is stored (if "No" in step ST20), the sign effective range determining unit 5 advances the processing to step ST40. In this case, because no information about a sign and an auxiliary sign has been stored in the effective sign storage buffer 6 yet, the sign effective range determining unit advances to step ST40. A process in step ST30 will be mentioned below.

Figure 4:
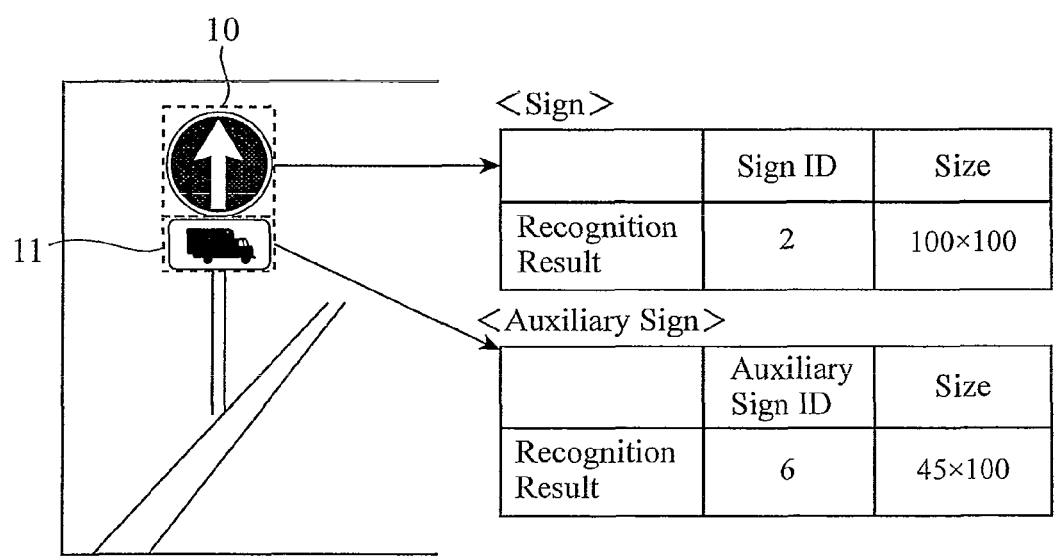
FIG. 4 is an explanatory drawing showing an example of a recognition result provided by a sign recognition unit shown in FIG. 1.

The sign recognition unit 2, in step ST40, performs recognition of a sign and an auxiliary sign from the inputted roadway image, and generates a recognition result with reference to the sign effective range data recording unit 7. FIG. 4 is an explanatory drawing showing a result of performing recognition of a sign from the roadway image shown in FIG. 3. FIG.

Figure 6:
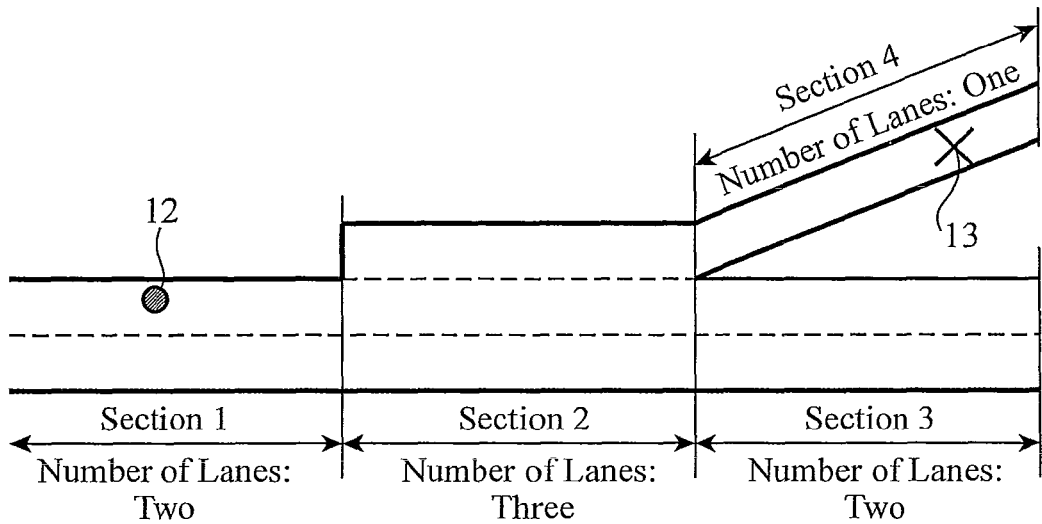
FIG. 6 is a diagram for explaining a calculation method of calculating the number of road sections.

5 is an explanatory drawing showing effective range data stored in the sign effective range data recording unit 7, FIG. 5(a) is a diagram showing effective range data about signs, and FIG. 5(b) is a diagram showing effective range data about auxiliary signs. As shown in FIG. 5, signs and auxiliary signs are managed with their respective specific ID numbers, and pieces of information including "sign category", "attribute value", "number of effective road sections", "prescribed size", and "image pattern" which are provided for every "sign ID" are prestored in a sign table of FIG. 5(a). Furthermore, pieces of information including "type", "attribute value", and "image pattern" which are provided for every "auxiliary sign ID" are prestored in an auxiliary sign table of FIG. 5(b). A "prescribed size" shows the number of pixels in vertical and horizontal directions of a corresponding "image pattern", and the "number of effective road sections" of a sign shows the number of road sections in which the sign is effective. FIG. 6 is a diagram for explaining a calculation method of calculating the number of road sections, and road sections are the ones into which a road is divided by some points including a point at which the number of lanes increases or decreases, and a road branching point. A further explanation of FIG. 6 will be made below.

In the example shown in FIG. 4, the sign recognition unit 2 recognizes a sign 10 in a broken line frame and an auxiliary sign 11 in another broken line frame from the roadway image, and compares each of the images of the sign 10 and the auxiliary sign 11 with the "image patterns" stored in the sign effective range data recording unit 7 to acquire the sign ID and the auxiliary sign ID of the image patterns which the images of the sign and the auxiliary sign match respectively. The sign recognition unit 2 then generates recognition results including the information about the IDs and sizes of the sign 10 and the auxiliary sign 11, as shown in the table of FIG. 4.

When the sign recognition unit 2, in step 50, has recognized a road sign as a result of performing the recognition of step ST40 (if "Yes" in step ST50), the sign recognition unit 2 advances the processing to next step ST60, or otherwise (if "No" in step ST50) the sign recognition unit 2 returns the processing to step ST10 again.

The sign effective range determining unit 5, in step ST60, makes a search so as to determine whether information about a currently-effective sign and a currently-effective auxiliary sign is stored in the effective sign storage buffer 6. When information about an effective sign and an effective auxiliary sign is stored (if "Yes" in step ST60), the end point position determining unit 9, in next step ST80, determines whether or not the vehicle has exceeded the end point position of the sign. In contrast, unless information about an effective sign and an effective auxiliary sign is stored (if "No" in step ST60), the sign effective range determining unit 5 advances the processing to step ST70. In this case, because no information about a sign and an auxiliary sign has been stored in the effective sign storage buffer 6 yet, the sign effective range determining unit advances to step ST70. A process in step ST80 will be mentioned below.

Figure 7:
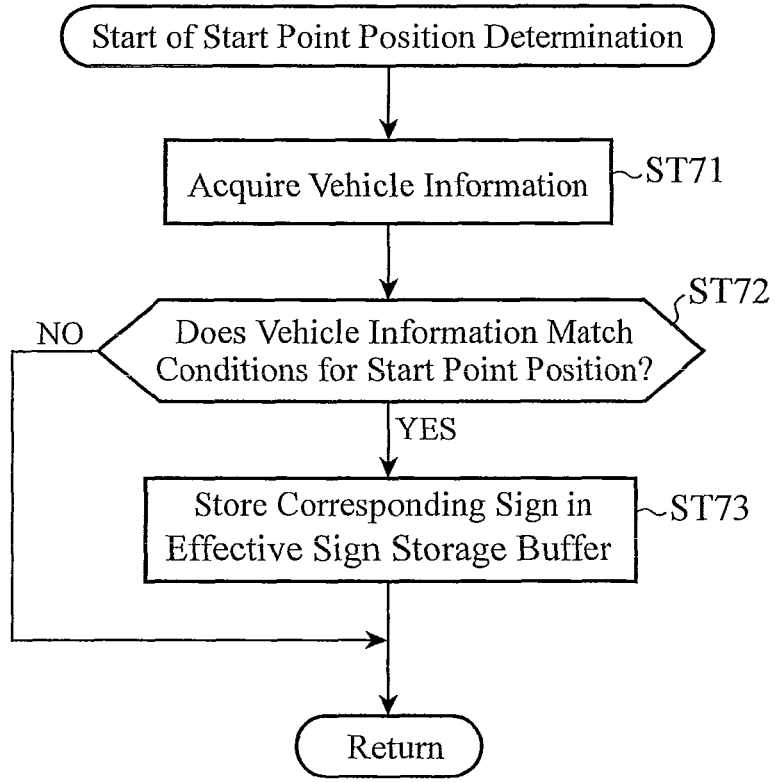
FIG. 7 is a flow chart showing the details of the determination of a start point position which is carried out by a start point position determining unit shown in FIG. 1.

In step ST70, the start point position determining unit 8 determines whether or not the vehicle has exceeded the start point position of a sign. FIG. 7 is a flow chart showing the details of the determination of whether or not the vehicle has exceeded the start point position of a sign which is carried out by the start point position determining unit 8. In step ST71, the start point position determining unit 8 acquires the vehicle information from the vehicle information acquiring unit 4 first. FIG. 8 is an explanatory drawing showing an example of the vehicle information which the vehicle information acquiring unit 4 acquires from a GPS sensor, various vehicle sensors, etc. For example, the vehicle information includes the "vehicle type" of the vehicle, the "current date", the "current position", the "vehicle direction", the state of the "horn" of the vehicle, and the state of the "brake" of the vehicle.

On the basis of the sign ID which the sign recognition unit 2 has recognized, the start point position determining unit 8, in step ST72, acquires the "prescribed size" corresponding to the sign ID from the effective range data about signs stored in the sign effective range data recording unit 7, and compares this "prescribed size" with the size of the sign which the sign recognition unit 2 has recognized. Furthermore, on the basis the auxiliary sign ID which the sign recognition unit 2 has recognized, the start point position determining unit 8 acquires the "type" and the "attribute value" corresponding to the auxiliary sign ID from the effective range data about auxiliary signs stored in the sign effective range data recording unit 7, and compares the "type" and the "attribute value" with the vehicle information acquired in step ST71.

When the size of the sign which the sign recognition unit has recognized is equal to or larger than the "prescribed size" and the vehicle information matches the conditions specified by the effective range data, the start point position determining unit 8 determines that the vehicle has entered the effective range of the sign and the auxiliary sign (if "Yes" in step ST72). In this example, when the size "100×100" of the sign 10 which the sign recognition unit 2 has recognized is equal to or larger than the "prescribed size" "80×80" of the sign ID "2", and the "vehicle type" showing "truck" included in the vehicle information which the vehicle information acquiring unit 4 has acquired matches the "vehicle type" showing "truck" of the auxiliary sign ID "6", the start point position determining unit 8 determines that the conditions for the start point position are satisfied.

The start point position determining unit 8, in step ST73, stores the sign ID and the auxiliary sign ID which the sign recognition unit 2 has recognized and the "current position" information acquired in step ST71, as the information about the currently-effective road sign, in the effective sign storage buffer 6. FIG. 9 is an explanatory drawing showing an example of information on road signs which the effective sign storage buffer 6 holds. "Sign/auxiliary sign IDs" are the sign ID and the auxiliary sign ID of a currently-effective sign and a currently-effective auxiliary sign which have been recognized by the sign recognition unit 2. The "registered position" of a currently-effective road sign is the "current position" information included in the corresponding vehicle information acquired from the vehicle information acquiring unit 4. The "number of traveled road sections" of a currently-effective road sign shows the number of road sections which the vehicle has traveled since the information about the currently-effective road sign was stored in the effective sign storage buffer 6, and its initial value is 0. After storing the information about a currently-effective road sign in the effective sign storage buffer 6, the start point position determining unit 8 ends the start point position determination.

In contrast, when the conditions for the start point position are not satisfied, the start point position determining unit 8 determines that the vehicles has not entered the effective range of the sign and the auxiliary sign (if "No" in step ST72), and ends the start point position determination without storing the information about the road sign in the effective sign storage buffer 6.

In the case in which the start point position determining unit 8, in step ST70 of FIG. 2, stores the information about a currently-effective road sign in the effective sign storage buffer 6, the sign recognition device returns the processing to step ST10 again and inputs a new roadway image to the sign recognition unit 2, and the sign effective range determining unit 5, in step ST20, checks that the information about a road sign is stored in the effective sign storage buffer 6 and advances to step ST30.

Figure 10:
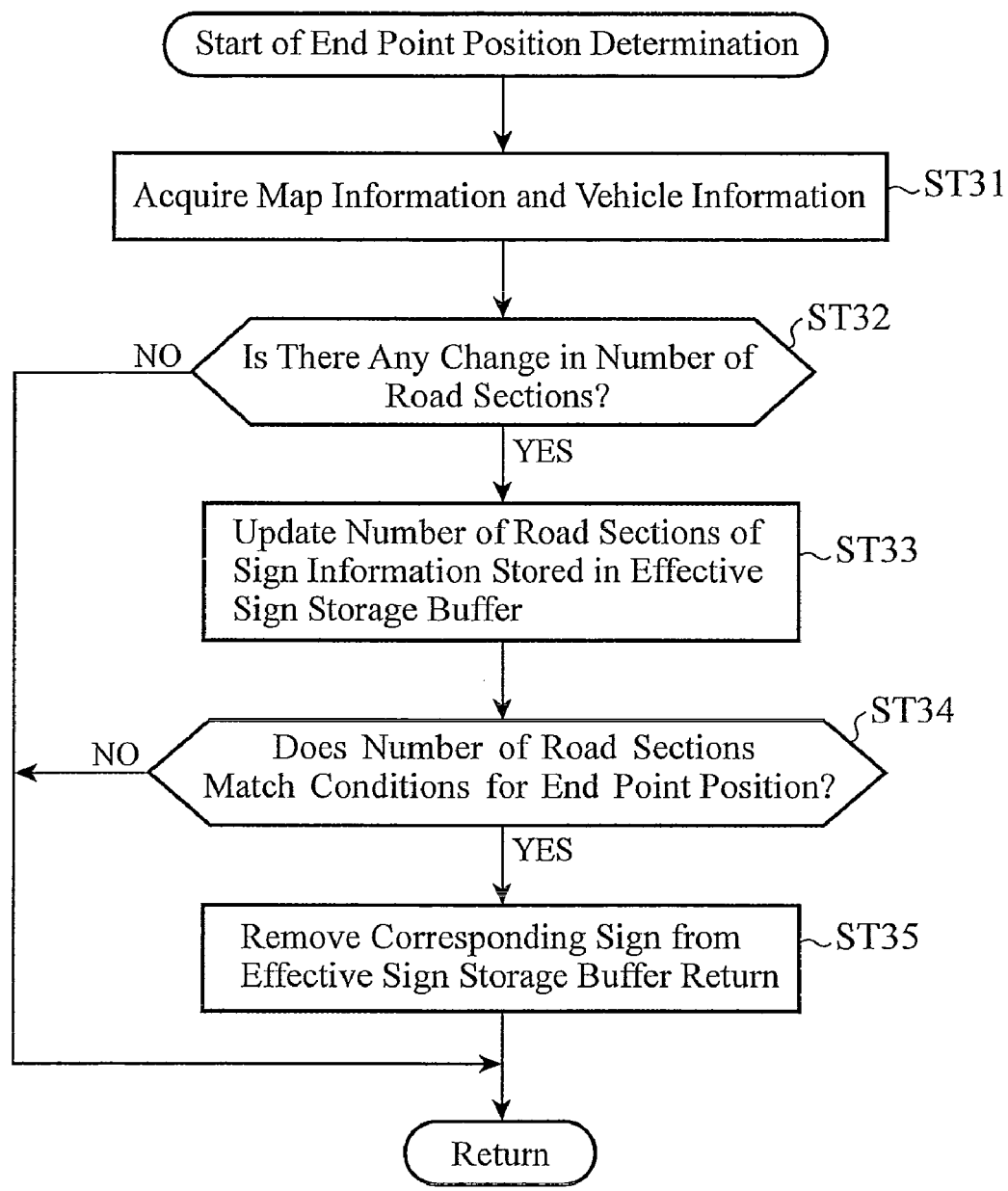
FIG. 10 is a flow chart showing the details of the determination of an end point position which is carried out by an end point position determining unit shown in FIG. 1.

The end point position determining unit 9, in step ST30, performs the determination of whether or not the vehicle has exceeded the end point position of the road sign. FIG. 10 is a flow chart showing the details of the end point position determination which is carried out by the end point position determining unit 9. In step ST31, the end point position determining unit 9 acquires the map information about an area surrounding the vehicle from the map information acquiring unit 3 first, and also acquires the vehicle information from the vehicle information acquiring unit 4.

The end point position determining unit 9, in step ST32, calculates the number of road sections which the vehicle has traveled from the "registered position" stored in the effective sign storage buffer 6, the "current position" information included in the vehicle information, and the map information. In the example of FIG. 6, assuming that the number of boundaries each between adjacent road sections which the vehicle has passed is the number of traveled road sections, when the vehicle has traveled from the "registered position" 12 to the "current position" 13, the numbers of traveled road sections is 2.

The end point position determining unit 9 compares the calculated number of traveled road sections with the "number of traveled road sections" stored in the effective sign storage buffer 6, and, when there is a change in the number of traveled road sections (if "Yes" in step ST32), and, in next step ST33, updates the "number of traveled road sections" stored in the effective sign storage buffer 6. FIG. 11 is an explanatory drawing showing a state of the effective sign storage buffer 6 after the "number of traveled road sections" shown in FIG. 9 is updated. In contrast, when there is no change in the number of traveled road sections (if "No" in step ST32), the end point position determining unit 9 ends the processing without updating the effective sign storage buffer 6.

In step ST34, the end point position determining unit 9 acquires the "number of effective road sections" from the sign effective range data recording unit 7 on the basis of the sign ID stored in the effective sign storage buffer 6, and then compares the "number of effective road sections" with the "number of traveled road sections". When the "number of traveled road sections" is equal to or larger than the "number of effective road sections", the end point position determining unit 9 determines that the vehicle has exceeded the end position of the effective range of the currently-effective road sign stored in the effective sign storage buffer 6 (if "Yes" in step ST34). In this example, because the "number of traveled road sections" "2" of the effective sign ID "1" (the sign ID "2") which is the currently-effective road sign is larger than the "number of effective road sections" "1" of the sign ID "2" stored in the sign effective range data recording unit 7, the conditions for the end point position of the sign are satisfied. The end point position determining unit 9 then, in step ST35, deletes the information about the effective sign ID whose end position of the effective range has been determined to have been passed by the vehicle from the effective sign storage buffer 6, and ends the end point position determination.

In contrast, when the conditions for the end point position of the sign are not satisfied, the end point position determining unit 9 determines that the vehicle has not gone out of the effective range of the sign and the auxiliary sign yet (if "No" in step ST34), and ends the end point position determination.

Because the end point position determining unit 9, in step ST80, has only to carry out the processing shown in FIG. 10, like in step ST30, the explanation of step ST80 will be omitted hereafter.

As previously explained, the start point position determining unit 8, in step ST72 of FIG. 7, determines whether or not the vehicle has exceeded the start point position of the effective range of a recognized sign by comparing the size of the sign acquired by the sign recognition unit 2 with the "prescribed size" of the sign stored in the sign effective range data recording unit 7. Instead of performing the size comparison, the start point position determining unit 8 can define the "current position" of the vehicle at the time when the sign recognition unit 2 recognized the sign as the start point position of the effective range of the sign. As an alternative, when a sign which has been recognized once by the sign recognition unit 2 goes out of sight from the shooting area of the vehicle-mounted camera and is no longer recognized by the sign recognition unit 2, the start point position determining unit 8 can define the "current position" at that time as the start point position of the effective range of the sign.

Furthermore, as previously explained, the start point position determining unit 8, in step ST72 of FIG. 7, determines whether or not the conditions for the start point position of the effective range of a road sign are satisfied by comparing the "vehicle type" included in the vehicle information acquired by the vehicle information acquiring unit 4 with the "vehicle type" of a corresponding auxiliary sign stored in the sign effective range data recording unit 7. The present invention is not limited to this example. For example, by comparing the "current date" included in the vehicle information with the "time" of the auxiliary sign stored in the sign effective range data recording unit 7, and then determining whether the "current date" falls within the "time" specified by the auxiliary sign, the start point position determining unit 8 can determine whether or not the conditions for the start point position are satisfied. As an alternative, by determining whether both the "vehicle type" and the "current date" included in the vehicle information satisfy their respective requirements, the start point position determining unit 8 can determine whether or not the conditions for the start point position are satisfied.

Furthermore, as previously explained, the end point position determining unit 9, in step ST34 of FIG. 10, determines whether the vehicle has exceeded the end point position of the effective range of a road sign by comparing the "number of traveled road sections" associated with the sign, which is stored in the effective sign storage buffer 6, with the corresponding "number of effective road sections" stored in the sign effective range data recording unit 7. The present invention is not limited to this example. For example, the end point position determining unit 9 can determine whether the vehicle has deviated from a continuous road section as a result of, for example, making a turn in a road on the basis of the "current position" and the "vehicle direction" of the vehicle which are acquired from the vehicle information acquiring unit 4, and the map information which is acquired from the map information acquiring unit 3, and can determine the position at which the vehicle has deviated from the road as the end point position of the effective range of the sign. As an alternative, by comparing the "number of traveled road sections" associated with the sign with the corresponding "number of effective road sections" and also determining whether the vehicle has deviated from a continuous road section as a result of, for example, making a turn in a road, the end point position determining unit can determine whether the vehicle has exceeded the end point position of the effective range of the road sign. As an alternative, when the end point position determining unit 9 acquires the "attribute value" of each sign stored in the effective sign storage buffer 6 from the sign effective range data recording unit 7, and the sign recognition unit 2 recognizes a sign having an attribute value which is the same as the "attribute value", the end point position determining unit can determine that the vehicle has exceeded the end point position of the effective range of the sign.

As mentioned above, the sign recognition device in accordance with this Embodiment 1 is constructed in such a way as to include: the sign effective range data recording unit 7 for storing conditions for an effective range including the number of effective road sections shown by a sign and an auxiliary sign; the sign recognition unit 2 for recognizing a sign and an auxiliary sign by using a captured image of a roadway in front of the vehicle; the vehicle information acquiring unit for acquiring vehicle information showing the current position, the vehicle type, the state, etc. of the vehicle; the map information acquiring unit 3 for acquiring map information about a map of an area surrounding the vehicle; and the sign effective range determining unit 5 for determining whether or not the vehicle is staying in the effective range specified by the sign and the auxiliary sign which have been recognized by the sign recognition unit 2 by using the effective range conditions stored in the sign effective range data recording unit 7, the vehicle information, and the map information. Therefore, the sign recognition device in accordance with this Embodiment 1 can correctly determine the effective range of a road sign, which the sign recognition device has recognized, for every road section. Furthermore, the sign recognition device in accordance with this Embodiment 1 can determine the effective range of a road sign more correctly in consideration of the conditions specified by an auxiliary sign corresponding to the road sign. Therefore, the sign recognition device in accordance with this Embodiment 1 can provide correct presentation of a road sign to the driver by using the result of the determination of the effective range of the road sign.

Embodiment 2.

In this Embodiment 2, as an example of a road sign which is a target for the determination of its effective range, a warning sign for announcing beforehand road conditions existing in front of the vehicle, such as a sharp bend warning sign, a T junction warning sign, or a lane warning sign is used. In the case of a warning sign, "preceding distance" information can be newly added to the effective range data (shown in FIG. 5) which the sign effective range data recording unit 7 in accordance with above-mentioned Embodiment 1 prestores. FIG. 12(a) shows effective range data about signs which a sign effective range data recording unit 7 in accordance with Embodiment 2 stores, and FIG. 12(b) shows effective range data about auxiliary signs which the sign effective range data recording unit 7 in accordance with Embodiment 2 stores. The "preceding distance" of a warning sign is the distance from the position of the warning sign to a specific point specified by this warning sign (referred to as a reference position from here on), such as a sharp bend, a T junction, a railway line, a railroad crossing, or a school or kindergarten.

Although the sign recognition device in accordance with this Embodiment 2 has the same structure as the sign recognition device in accordance with above-mentioned Embodiment 1, an end point position determining unit 9 in accordance with this Embodiment 2 operates in a different way. The following explanation will be made focusing on a difference in operation between Embodiment 1 and this Embodiment 2 with reference to the block diagram of FIG. 1 and the flow chart of FIG. 2.

The end point position determining unit 9, in step ST30 or ST80 shown in FIG. 2, starts the determination of whether or not the vehicle has exceeded the end point position of a road sign. In each of steps ST31 to ST33, and ST35 shown in FIG. 10, the end point position determining unit 9 carries out the same process as that of above-mentioned Embodiment 1, while only the process of step ST34 by the end point position determining unit 9 differs from that of above-mentioned Embodiment 1. The end point position determining unit 9, in step ST34, calculates the traveled distance of the vehicle on the basis of the "registered position" of a road sign stored in the effective sign storage buffer 6, and the "current position" included in the vehicle information which the end point position determining unit has acquired from a vehicle information acquiring unit 4 to compare this traveled distance with the "preceding distance" stored in the sign effective range data recording unit 7 shown in FIG. 12, and, if the traveled distance is longer than the "preceding distance", determines that the current position has exceeded the end point position of the effective range of the road sign (if "Yes" in step ST34). More specifically, the end point position determining unit 9 determines that the vehicle has passed the end position of the effective range of the road sign, and then advances to next step ST35. In contrast, when the traveled distance is equal to or shorter than the "preceding distance", the end point position determining unit 9 determines that the vehicle has not gone out of the effective range of the sign and the auxiliary sign (if "No" in step ST34), and ends the end point position determination.

Figure 13:
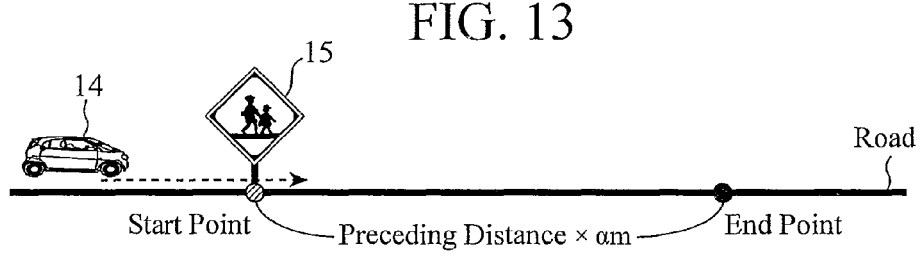
FIG. 13 is a diagram for explaining the determination of an end point position which is carried out by an end point position determining unit in accordance with Embodiment 2, and shows an example of changing the effective range of a warning sign by using a weight alpha for a "preceding distance"

As previously explained, the end point position determining unit 9, in step ST34 of FIG. 10, determines whether or not the current position has exceeded the end point position of the effective range of a road sign by comparing the traveled distance of the vehicle which it has calculated with the "preceding distance" stored in the sign effective range data recording unit 7. As an alternative, the end point position determining unit can adjust the effective range of this "preceding distance", i.e., the position of the end point by using a weight alpha. FIG. 13 is a diagram for explaining the determination of whether or not the vehicle has exceeded the end point position which is carried out by the end point position determining unit 9 in accordance with Embodiment 2, and shows an example of changing the effective range of a warning sign by using a weight alpha for the "preceding distance". In the example of FIG. 13, in the sign recognition device, the sign recognition unit 2 recognizes a warning sign 15 which is existing in front of the vehicle 14, the start point position determining unit 8 uses the position of the warning sign 15 as the start point position of the effective range of the warning sign 15 so as to determine whether or not the vehicle 14 has entered the effective range, and the end point position determining unit 9 uses the end point position shown by the "preceding distance" and the weight alpha so as to determine whether or not the vehicle 14 has gone out of the effective range of the warning sign 15.

Figure 14:
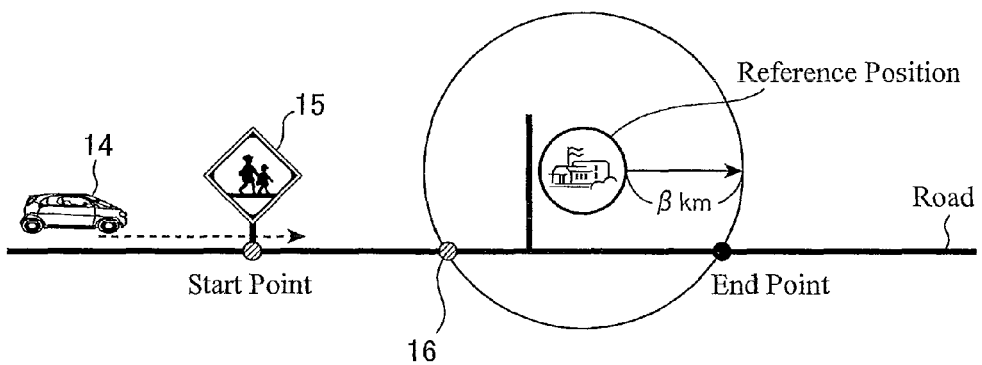
FIG. 14 is a diagram for explaining the determination of an end point position by the end point position determining unit in accordance with Embodiment 2, and shows an example of changing the effective range of a warning sign by using a reference position and a specific distance beta.

Furthermore, as previously explained, the end point position determining unit 9, in step ST34 of FIG. 10, determines whether or not the vehicle has gone out of the effective range of the sign by comparing the traveled distance which the end point position determining unit has calculated on the basis of the "registered position" of the sign stored in the effective sign storage buffer 6, and the "current position" included in the vehicle information acquired by the vehicle information acquiring unit 4 with the "preceding distance". The present invention is not limited to this example. For example, the end point position determining unit 9 can acquire the reference position specified by the warning sign stored in the effective sign storage buffer 6 on the basis of the "current position" included in the vehicle information and the map information acquired by the map information acquiring unit 3, and, when the "current position" of the vehicle has gone out of a region at a specific distance beta from this reference position, determine that the vehicle has gone out of the effective range of the warning sign. FIG. 14 is a diagram for explaining the determination of whether or not the vehicle has exceeded the end point position of a warning sign which is carried out by the end point position determining unit 9 in accordance with Embodiment 2, and shows an example of changing the effective range of the warning sign by using the reference position and the specific distance beta. In the example of FIG. 14, the end point position determining unit 9 acquires the position of the school or kindergarten specified by the "attribute value" of the warning sign 15 from the map information on the basis of the "current position" included in the vehicle information, and then uses the reference position to set up the specific distance beta from this reference position. In this case, the end point position determining unit defines a circular region having a center at the reference position and having a radius of the specific distance beta as the effective range of the warning sign 15, and the start point position determining unit 8 can use the position of the warning sign 15 as the start point position 16 of the effective range of the warning sign, or can use a crossing point at which this circle and the road along which the vehicle is traveling cross each other as the start point position 16.

As mentioned above, the sign recognition device in accordance with this Embodiment 2 is constructed in such a way that the sign effective range data recording unit 7 stores information about a distance as effective range conditions shown by a sign and an auxiliary sign, and the sign effective range determining unit 5 determines whether or not the vehicle is staying in the effective range specified by a sign and an auxiliary sign which the sign recognition unit 2 has recognized by using the information about a distance stored in the sign effective range data recording unit 7. Therefore, in the case of a warning sign announcing beforehand road conditions existing in front of the vehicle, the sign recognition device in accordance with this Embodiment 2 can correctly determine the effective range of a road sign which the sign recognition device has recognized. Therefore, the sign recognition device in accordance with this Embodiment 1 can provide correct presentation of a road sign to the driver by using the result of the determination of the effective range of the road sign.

Embodiment 3.

In this Embodiment 3, as an example of a road sign which is a target for the determination of its effective range, a road sign having an auxiliary sign showing an end of the effective range of a specific sign is used.

Although a sign recognition device in accordance with this Embodiment 3 has the same structure as the sign recognition device in accordance with above-mentioned Embodiment 1, an end point position determining unit 9 in accordance with this Embodiment 3 operates in a different way. The following explanation will be made focusing on a difference in operation between Embodiment 1 and this Embodiment 3 with reference to the block diagram of FIG. 1 and the flow chart of FIG. 2. It is assumed that the effective range data about signs and the effective range data about auxiliary signs which are shown in FIG. 5 are stored in a sign effective range data recording unit 7 in accordance with this Embodiment 3.

Figure 15:
FIG. 15 is a diagram for explaining the determination of an end point position which is carried out by an end point position determining unit in accordance with Embodiment 3, and shows an example in which the end point position determining unit determines an end point position by using an auxiliary sign showing the end point position of a sign.

FIG. 15 is a diagram for explaining the determination of whether or not the vehicle has exceeded the endpoint position of a road sign which is carried out by an end point position determining unit 9 in accordance with Embodiment 3, and shows an example in which the end point position determining unit determines whether or not the vehicle has exceeded the endpoint position of signs 17 and 19 by using an auxiliary sign 20 showing the endpoint position. It is assumed that a sign recognition unit 2 recognizes the sign ID of the sign 17 and the auxiliary sign ID of an auxiliary sign 18, the start point position determining unit 8 determines that the vehicle 14 has entered the effective range of the sign 17, and the IDs of the sign 17 and the auxiliary sign 18 are already stored in the effective sign storage buffer 6 (step ST70 of FIG. 2). The sign recognition device is in a state in which the sign recognition unit 2 newly recognizes the sign 19 and the auxiliary sign 20, and the end point position determining unit performs the determination of step ST80.

The endpoint position determining unit 9, in step ST80, executes steps ST31 to ST33 shown in FIG. 10, and, in next step ST34, acquires the "attribute value" "start" of the auxiliary sign 18 stored in the sign effective range data recording unit 7 on the basis of the auxiliary sign ID of the auxiliary sign 18 stored in the effective sign storage buffer 6 (refer to FIG. 5(b)), and also acquires the "attribute value" "end" of the auxiliary sign 20 stored in the sign effective range data recording unit 7 on the basis of the auxiliary sign ID of the auxiliary sign 20 which the sign recognition unit has newly recognized. When the end point position determining unit 9 compares both the "attribute values", and then determines that there is a correspondence between both the "attribute values", the end point position determining unit 9 determines that the vehicle has exceeded the end point position of the effective range of the sign 19 (if "Yes" in step ST34). In this case, because "start" and "end" have a correspondence between them, the end point position determining unit 9 determines that the position of the sign 19 and the auxiliary sign 20 is the end point position. In contrast, when there is no correspondence between both the "attribute values", the end point position determining unit 9 determines that the vehicle 14 has not gone out of the effective range of the signs 17 and 19 (if "No" in step ST34), and ends the end point position determination.

In the example shown in FIG. 5(b), the "attribute values" of the auxiliary sign IDs "1" and "2" are "start" and "end", and there is a correspondence between these "attribute values". In contrast, in an example, as shown in FIG. 12(b), in which the "attribute values" of the auxiliary sign IDs "1" and "2" are simply "section", the end point position determining unit 9 can determine that the position of the sign 19 and the auxiliary sign 20 is the endpoint position of the effective range of the sign stored in the effective sign storage buffer 6 as long as both the "attribute values" match each other.

Figure 16:
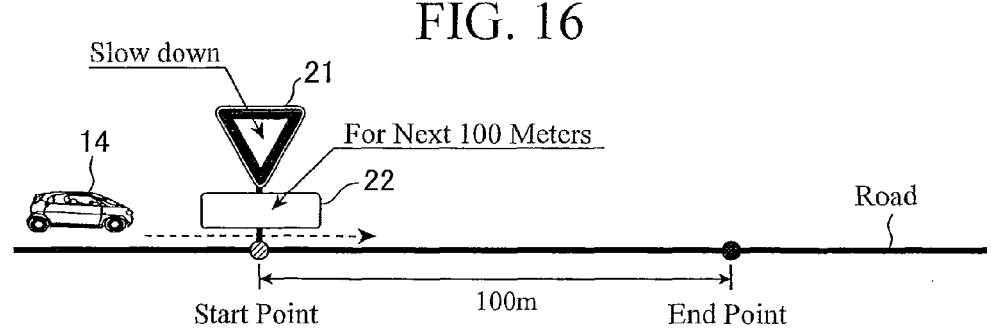
FIG. 16 is a diagram for explaining the determination of an end point position which is carried out by the end point position determining unit in accordance with Embodiment 3, and shows an example in which the end point position determining unit determines an end point position by using an auxiliary sign showing the effective range of a sign.

In the above-mentioned explanation, as shown in FIG. 15, the example in which an auxiliary sign shows an end of the effective range of a specific sign is shown. Even in a case in which an auxiliary sign shows the effective range of a specific sign from its sign position, as shown in FIG. 16, the end point position determining unit 9 can determine whether or not the vehicle has exceeded the end point position of the sign. FIG. 16 is a diagram for explaining the end point position determination carried out by the end point position determining unit in accordance with Embodiment 3, and shows an example in which the end point position determining unit determines whether or not the vehicle has exceeded the end point position of a sign 21 by using an auxiliary sign 22 showing the effective range. In a case in which the auxiliary sign stored in the effective sign storage buffer 6 is the auxiliary sign 22 shown in FIG. 16, the end point position determining unit 9 calculates the traveled distance of the vehicle first from the "current position" included in the vehicle information which the vehicle information acquiring unit 4 has acquired, and the "registered position" stored in the effective sign storage buffer 6. The end point position determining unit 9 then compares this traveled distance with the "attribute value" "distance" of the auxiliary sign ID of the auxiliary sign 22 stored in the sign effective range data recording unit 7 (e.g., the "attribute value" "100" meters of the auxiliary sign ID of 3), and, when the traveled distance is longer than the distance shown by the auxiliary sign 20, determines that the vehicle has exceeded the end point position of the effective range of the sign 21.

As previously explained, the end point position determining unit 9 carries out the comparison and determination by using the "distance" which is preset to the "attribute value" of the auxiliary sign stored in the sign effective range data recording unit 7. As an alternative, the end point position determining unit 9 can carry out the comparison and determination by using a result of recognizing the characters showing the distance specified by the auxiliary sign from the image captured by the vehicle-mounted camera.

As mentioned above, the sign recognition device in accordance with this Embodiment 3 is constructed in such a way that the sign effective range data recording unit 7 prestores effective range conditions shown by an auxiliary sign, and the sign effective range determining unit 5 determines whether or not the vehicle is staying in the effective range specified by a sign and an auxiliary sign which the sign recognition unit 2 has recognized by using the effective range conditions for the auxiliary sign which are stored in the sign effective range data recording unit 7. Therefore, the sign recognition device in accordance with this Embodiment 3 can determine the effective range of a road sign, which the sign recognition device has recognized, correctly by using, as well as the information shown by the sign, and the information shown by a corresponding auxiliary sign. Therefore, the sign recognition device in accordance with this Embodiment 3 can provide correct presentation of a road sign to the driver by using the result of the determination of the effective range of the road sign.

Embodiment 4.

In accordance with this Embodiment 4, for the determination of the endpoint position of the effective range of a road sign, a sign recognition device uses not only information about the sign and an auxiliary sign, but also information about the state of the vehicle which is based on the outputs of various sensors installed in the vehicle, such as the brake state. To this end, "vehicle sensor termination condition" information is newly added to the effective range data (FIG. 5) prestored in the sign effective range data recording unit 7 in accordance with above-mentioned Embodiment 1. This "vehicle sensor termination condition" is a setting condition based on the vehicle information, for determining whether or not the vehicle has exceeded the end point position of the effective range of a road sign when the condition is satisfied. FIG. 17(*a*) shows effective range data about signs which a sign effective range data recording unit 7 in accordance with Embodiment 4 stores, and FIG. 17(*b*) shows effective range data about auxiliary signs which the sign effective range data recording unit 7 in accordance with Embodiment 4 stores.

Although a sign recognition device in accordance with this Embodiment 4 has the same structure as the sign recognition device in accordance with above-mentioned Embodiment 1, an end point position determining unit 9 in accordance with this Embodiment 4 operates in a different way. The following explanation will be made focusing on a difference in operation between Embodiment 1 and this Embodiment 4 with reference to the block diagram of FIG. 1 and the flow chart of FIG. 2. In step ST30 or step ST80 shown in FIG. 2, the end point position determining unit 9 starts the determination of whether or not the vehicle has exceeded the end point position of the effective range of a road sign. In each of steps ST31 to ST33, and ST35 shown in FIG. 10, the end point position determining unit 9 carries out the same process as that of above-mentioned Embodiment 1, while only the process of step ST34 by the end point position determining unit 9 differs from that of above-mentioned Embodiment 1.

Figure 18:
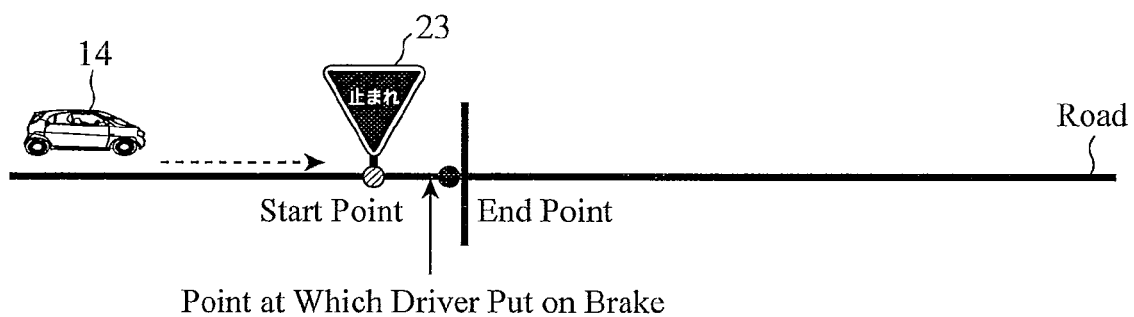
FIG. 18 is a diagram for explaining the determination of an end point position carried out by an end point position determining unit in accordance with Embodiment 4, and shows an example in which the end point position determining unit determines the end point position of a sign by using vehicle sensor termination conditions.

FIG. 18 is a diagram for explaining the end point position determination carried out by the end point position determining unit 9 in accordance with Embodiment 4, and shows an example in which the end point position determining unit 9 determines whether or not the vehicle has exceeded the end point position of a regulatory sign 23 by using the vehicle sensor termination condition of the sign. Hereafter, it is assumed that a sign recognition unit 2 recognizes the sign ID of the regulatory sign 23, a start point position determining unit 8 determines that the vehicle 14 has entered the effective range of the regulatory sign, and the ID of the regulatory sign 23 is already stored in the effective sign storage buffer 6 (step ST70 of FIG. 2).

The end point position determining unit 9, in step ST34, uses the sign ID of the regulatory sign 23 which is the target for the determination of its effective range, the sign ID being stored in the effective sign storage buffer 6, to acquire the "vehicle sensor termination condition" from the sign effective range data recording unit 7, and compares this condition with "horn" information and "brake" information acquired from the vehicle information acquiring unit 4. When determining that the condition is satisfied as a result of the comparison, the end point position determining unit 9 determines that the vehicle has exceeded the end point position of the effective range of the regulatory sign 23.

In the example of FIG. 18, the regulatory sign 23 is a road sign that instructs drivers to "stop". Therefore, the "vehicle sensor termination condition" of the sign ID corresponding to the regulatory sign 23 are preset to "brake=ON". In a case in which the start point position determining unit determines that the position of the regulatory sign 23 is the start point position, after the sign recognition device determines that the vehicle 14 has reached this start point position, the end point position determining unit 9 acquires the "vehicle sensor termination condition" which is "brake-ON" and is stored in the sign effective range data recording unit 7, and compares this condition with the "brake" information included in the vehicle information acquired from the vehicle information acquiring unit 4. At this time, when the acquired vehicle information shows that the driver has put on the brake (ON), the end point position determining unit uses the position at which the driver put on the brake as the end point position to determine that the vehicle has deviated from the effective range of the regulatory sign 23. An end point shown in FIG. 18 is at the end point position based on the "number of effective road sections" which the end point position determining unit 9 in accordance with above-mentioned Embodiment 1 determines.

As mentioned above, the sign recognition device in accordance with this Embodiment 4 is constructed in such a way that the sign effective range data recording unit 7 prestores, as an effective range condition shown by a sign and an auxiliary sign, a condition for the state of the vehicle which corresponds to an instruction shown by the sign, and the sign effective range determining unit 5 determines whether or not the vehicle is staying in the effective range specified by the sign and the auxiliary sign which the sign recognition unit 2 has recognized by using the condition for the state of the vehicle stored in the sign effective range data recording unit 7.

Therefore, the sign recognition device in accordance with this Embodiment 4 can correctly determine the effective range of a road sign which the sign recognition device has recognized according to whether or not an instruction shown by the road sign has been executed. Therefore, the sign recognition device in accordance with this Embodiment 4 can provide correct presentation of a road sign to the driver by using the result of the determination of the effective range of the road sign.

In the above-mentioned explanation, the case in which any of above-mentioned Embodiments 2 to 4 is applied to the structure shown by the above-mentioned embodiment 1 is shown, though the present invention is only limited to those examples. For example, the structures in accordance with above-mentioned Embodiment 2 to 4 can be combined properly. In the case of using the method of determining the start point position of a road sign which is executed by the start point position determining unit 8, the sign recognition device has only to determine whether or not the vehicle is staying in the effective range by using the start point position of the effective range which the start point position determining unit 8 has determined by using any one of the methods in accordance with above-mentioned embodiments. Similarly, in the case of using the method of determining the end point position of a road sign which is executed by the end point position determining unit 9, the sign recognition device has only to determine whether or not the vehicle is staying in the effective range by using the end point position of the effective range which the end point position determining unit 9 has determined by using any one of the methods in accordance with above-mentioned embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sign recognition device comprising:
a sign effective range data recording unit for storing conditions for an effective range shown by a sign and an auxiliary sign;
a sign recognition unit for recognizing a sign and an auxiliary sign by using a captured image of a roadway in front of a vehicle; and
a sign effective range determining unit for determining whether or not the vehicle is staying in an effective range specified by the sign and the auxiliary sign which have been recognized by said sign recognition unit by using information about the vehicle, map information, and conditions for said effective range which are stored in said sign effective range data recording unit, wherein said sign effective range determining unit includes a start point position determining unit for determining a position of a start point of the effective range specified by said sign and said auxiliary sign which have been recognized by said sign recognition unit, and for, when the vehicle has entered the effective range specified by said sign and said auxiliary sign, storing a result of the recognition of said sign and said auxiliary sign in an effective sign storage buffer, and an end point position determining unit for determining a position of an end point of the effective range specified by said sign and said auxiliary sign whose recognition result is stored in said effective sign storage buffer, and for, when the vehicle has deviated from the effective range specified by said sign and said auxiliary sign, deleting the result of the recognition of said sign and said auxiliary sign from said effective sign storage buffer.

2. The sign recognition device according to claim 1, wherein the sign effective range data recording unit prestores a number of effective road sections showing an effective range for every sign type, and the end point position determining unit calculates a number of road sections which the vehicle has traveled from the start point of the sign stored in the effective sign storage buffer to a current position of the vehicle by using vehicle information showing said current position of the vehicle, and, when the number of traveled road sections exceeds the number of effective road sections shown by said sign, determines that the vehicle has deviated from the effective range of said sign.

3. The sign recognition device according to claim 1, wherein the sign effective range data recording unit prestores a number of effective road sections or a distance showing an effective range for every auxiliary sign type, and, in a case in which the sign recognition unit has recognized an auxiliary sign showing a number of effective road sections or a distance, when determining that said current position has exceeded the number of effective road sections or the distance shown by said auxiliary sign by using vehicle information showing a current position of the vehicle, the end point position determining unit determines that the vehicle has deviated from the effective range of said sign.

4. The sign recognition device according to claim 1, wherein the sign effective range data recording unit prestores a number of effective road sections or a distance showing an effective range for every sign type and for every auxiliary sign type, and, when determining that the vehicle has made a turn in a road and deviated from a continuous road section by using vehicle information showing a current position of the vehicle, the end point position determining unit determines that the vehicle has deviated from the effective range of the sign or the auxiliary sign stored in the effective sign storage buffer.

5. The sign recognition device according to claim 1, wherein when the sign recognition unit has recognized an auxiliary sign showing an end of an effective range of a specific sign, the end point position determining unit determines that the vehicle has deviated from the effective range of said specific sign if information about a sign corresponding to the specific sign exists in the effective sign storage buffer.

6. The sign recognition device according to claim 1, wherein in a case in which the sign recognition unit has recognized a sign announcing beforehand road conditions existing in front of the vehicle, the end point position determining unit acquires a reference position at which the road conditions announced by the sign exist by using map information about a map of an area surrounding the vehicle, and determines that the vehicle has deviated from the effective range of the sign when determining that the vehicle has gone out of an area at a predetermined distance from the reference position by using vehicle information showing a current position of the vehicle.

7. The sign recognition device according to claim 1, wherein the sign effective range data recording unit prestores a condition for a state of the vehicle corresponding to an instruction shown by a sign for every sign type, and, when determining that the state of the vehicle satisfies a condition for the state of the vehicle of a sign stored in the effective sign storage buffer by using vehicle information showing the state of the vehicle, the end point position determining unit determines that the vehicle has deviated from the effective range of said sign.

8. The sign recognition device according to claim 1, wherein the sign effective range data recording unit prestores attribution information for every auxiliary sign type, and, when attribution information about the auxiliary sign which the sign recognition unit has recognized matches attribution information about the auxiliary sign stored in the effective sign storage buffer, the end point position determining unit determines that the vehicle has deviated from the effective range of the sign stored in the effective sign storage buffer.

9. The sign recognition device according to claim 2, wherein when the end point position determining unit determines that the vehicle has deviated from the effective range of the sign stored in the effective sign storage buffer, the sign effective range determining unit deletes the recognition result of said sign and the auxiliary sign from the effective sign storage buffer.

10. The sign recognition device according to claim 1, wherein the sign effective range data recording unit prestores a defined size of a sign and a defined size of an auxiliary sign, and, when a size of the sign or the auxiliary sign which the sign recognition unit has recognized is equal to or larger than said defined size, the start point position determining unit determines that the vehicle has entered the effective range of the sign or the auxiliary sign which said sign recognition unit has recognized.

11. The sign recognition device according to claim 1, wherein when the sign recognition unit does not recognize the sign or the auxiliary sign which the sign recognition unit has recognized once, the start point position determining unit determines that the vehicle has entered the effective range of the sign or the auxiliary sign.

12. The sign recognition device according to claim 1, wherein the sign effective range data recording unit stores information about a vehicle type corresponding to a sign and an auxiliary sign, and, in a case in which the sign recognition unit has recognized a sign or an auxiliary sign showing a specific vehicle type, when determining that a vehicle type of the vehicle matches the specific vehicle type by using vehicle information showing the vehicle type of the vehicle, the start point position determining unit determines that the vehicle has entered the effective range of the sign or the auxiliary sign which said sign recognition unit has recognized.

13. The sign recognition device according to claim 1, wherein the sign effective range data recording unit stores information about an effective time zone corresponding to a sign and an auxiliary sign, and, in a case in which the sign recognition unit has recognized a sign or an auxiliary sign showing a specific effective time zone, when a current date matches the specific effective time zone, the start point position determining unit determines that the vehicle has entered the effective range of the sign or the auxiliary sign which said sign recognition unit has recognized.

14. The sign recognition device according to claim 10, wherein when the start point position determining unit determines that the vehicle has entered the effective range of the sign which said sign recognition unit has recognized, the sign effective range determining unit stores the result of the recognition of said sign and the auxiliary sign in the effective sign storage buffer.

\* \* \* \* \*